(12) United States Patent
Demont et al.

(10) Patent No.: US 11,274,941 B2
(45) Date of Patent: Mar. 15, 2022

(54) DEVICE AND METHOD FOR DETERMINING A TOTAL PITCH DEVIATION OF AN ANNULAR PRODUCT

(71) Applicant: Aktiebolaget SKF, Gothenburg (SE)

(72) Inventors: Jérémy Demont, Chenonceaux (FR); Pascal Durif, Ballan-Miré (FR); Yves-André Liverato, Saint Paterne Racan (FR); Benedicte Thomas, Tours (FR)

(73) Assignee: Aktiebolaget SKF, Gothenburg (SE)

( * ) Notice: Subject to any disclaimer, the term of this patent is extended or adjusted under 35 U.S.C. 154(b) by 0 days.

(21) Appl. No.: 17/092,228

(22) Filed: Nov. 7, 2020

(65) Prior Publication Data

US 2021/0156716 A1 May 27, 2021

(30) Foreign Application Priority Data

Nov. 27, 2019 (DE) .......................... 102019218321.2

(51) Int. Cl.
*G01D 5/14* (2006.01)
(52) U.S. Cl.
CPC .................................... *G01D 5/145* (2013.01)
(58) Field of Classification Search
CPC ............................... G01D 5/145; G01M 13/04
See application file for complete search history.

(56) References Cited

U.S. PATENT DOCUMENTS

2008/0243427 A1* 10/2008 Ono ...................... F16C 19/522
702/151

FOREIGN PATENT DOCUMENTS

EP 2985583 A1 * 2/2016 .......... G01M 13/045

* cited by examiner

*Primary Examiner* — Clayton E. LaBalle
*Assistant Examiner* — Michael A Harrison
(74) *Attorney, Agent, or Firm* — Garcia-Zamor Intellectual Property Law; Ruy Garcia-Zamor; Bryan Peckjian

(57) ABSTRACT

A total pitch deviation measurement device that determines a total pitch deviation of an annular product having at least a magnetic ring. The device providing a frame; a pallet conveyor fixed to the frame and designed to support the rotor positioning bearing unit; a spindle unit mounted in translation compared to the frame along a vertical axis, the spindle unit including a spindle shaft, a motor driving the spindle shaft, and an encoder connected to the spindle shaft; the spindle shaft having a free lower end having a tapered shape that fits into a bore of the annular product; a sensor fixed to the frame that measures a magnetic field signal at a position of the magnetic ring and transmits the signal measured to an control unit that determines the total pitch deviation of the annular product. Also, a method for carrying out the function of the intended device.

10 Claims, 7 Drawing Sheets

DEVICE AND METHOD FOR DETERMINING A TOTAL PITCH DEVIATION OF AN ANNULAR PRODUCT

CROSS-REFERENCE TO RELATED APPLICATIONS

This application claims priority to German Patent Application no. 102019218321.2, filed Nov. 27, 2019, the contents of which is fully incorporated herein by reference.

TECHNICAL FIELD OF THE INVENTION

The present invention relates to a device and a method for measuring a total pitch deviation of a magnetic ring of a rotor positioning bearing unit.

BACKGROUND OF THE INVENTION

Today, rotor positioning bearing units are commonly used in a wide range of technical fields, for example in automotive industry. These units provide high quality signals while allowing integration in compact apparatus.

Such a rotor positioning bearing unit generally comprises a bearing, a magnetic ring, and is combined with detection means facing the impulse ring. The impulse ring is provided with a target holder fixed to the inner ring of the bearing, and with a magnetized target fixed to the target holder beyond the outer ring of the bearing.

The magnetic target includes alternating North and South poles, whose number depends on bearing size, detection precision and particular application and on the number of North and South poles of the rotor. The detection means may be fixed to the outer ring of the bearing or to a fixed casing.

The magnetic target is attached to an outer tubular portion of the target holder. The target holder is also provided with an inner tubular portion secured into a groove made in the bore of the inner ring.

To characterize the magnetic ring, the total pitch deviation, named TPD, can be used. It evaluates the cumulative error on the position of the magnetic ring by measuring the single pitch deviation for each ring pole.

Determination of the TPD for a magnetic ring with magnetic poles is similar to the determination of the TPD for gears or mechanical encoders as seen in ABS applications.

An interval is defined as the angular distance between two nearest poles of same polarity. A general method to calculate TPD is described by the following equations:

Single pitch deviation error SPD for an interval i can be calculated on the basis of the formula:

$$SPD(i) = \frac{P_{Theoretical} - P_{real}(i)}{P_{Theoretical}} \times 100$$

wherein: $P_{Theoretical}$: Theoretical period of the angular signal for an interval;

$P_{real}(i)$: Actual period of the angular signal for the interval i.

It is to be noted that the actual period $P_{real}(i)$ is to be determined between poles of same sign, i.e. between North poles or between South poles. Similarly, the actual period $P_{real}(i)$ is to be determined between the same kind of signal edges, i.e. between rising edges or between falling edges.

Total or cumulative pitch deviation error TPD(i) for an interval i can be calculated on the basis of the formula:

$$TPD(i) = \sum_{n=1}^{n=i} SPD(n)$$

Total pitch deviation error TPD on a mechanical turn can be calculated on the basis of the formula:

$$TPD = \max\left(\sum_{i=1}^{i=Nbpp} SPD(i)\right) - \min\left(\sum_{i=1}^{i=Nbpp} SPD(i)\right)$$

wherein Nbpp: Number of intervals in a mechanical turn.

Known TPD measurement devices generally comprises a product holder made of an expensive mandrel which does not confer reliable positioning during TPD measurements.

Furthermore, known TPD measurement devices need human intervention which involves positioning errors.

There is a need to provide an improved TPD measurement device having reduced runout of the product and thus erroneous positioning of the rotor positioning bearing unit compared to a referenced surface during TPD measurement.

Furthermore, there is a need to reduce human intervention on TPD measurement devices, in order to provide a reliable positioning of the product.

The aim of the present invention is consequently to provide a fully automated TPD measurement device with improved product runout and positioning of the product during TPD measurement.

SUMMARY OF THE INVENTION

The terms "product runout" correspond to the deviation of the product shape from a perfect circle centered on the rotation axis of the product.

The invention relates to a total pitch deviation (TPD) measurement device configured to determine a total pitch deviation of an annular product having at least a magnetic ring.

The device comprises a frame; a pallet conveyor fixed to the frame and designed to support the annular product; a spindle unit mounted in translation compared to the frame along a vertical axis, the spindle unit comprising at least a spindle shaft, for example rotatably mounted in a spindle shaft sleeve, a motor rotatably driving the spindle shaft, and an encoder rigidly connected to the spindle shaft; the spindle shaft comprising a free lower end having a tapered shape configured to be fitted in a bore of the annular product; a sensor fixed to the frame and configured to measure a magnetic field signal at a position of the magnetic ring and to transmit the signal to an electronic control unit for determining the total pitch deviation; a lifting unit configured to move the annular product upwards along the vertical axis on the spindle shaft before a magnetic field measurement step; and a mechanical system configured to provide the required fitting load to guarantee the position of the annular product on the spindle shaft before the magnetic field measurement step.

The tapered shape allows the annular product to be centered along the shaft and allows to avoid errors in the positioning of the annular product.

In an embodiment, the TPD device comprises an extraction unit configured to extract the annular product from the spindle shaft after magnetic field measurement is completed.

At least one part of the outer diameter of the spindle shaft is substantially equal to the inner diameter of the annular product, so that the shaft is rotatably connected to the product.

For example, the spindle shaft is rotatably mounted in a spindle shaft sleeve and supported by a plurality of bearings located between the outer surface of the spindle shaft and the inner surface or bore of the sleeve.

For example, the spindle unit, formed by the spindle shaft, the spindle sleeve, the motor and the encoder, is slidably mounted along an axis guide fixed to the frame. Therefore, the spindle unit comprises a guiding plate having a through hole receiving the axis guide.

In an embodiment, the mechanical system configured to provide a fitting load comprises two pulleys rotatably mounted on the frame, a belt surrounding the pulleys and secured to the spindle unit and to a counterweight designed for setting a fitting load of the spindle unit in the bore of the bearing unit.

The counterweight of the mechanical system is lighter than spindle unit and weight difference determines the fitting load of the spindle shaft in the bore of the annular product.

For example, the axis of each pulley is located in a corresponding slotted hole allowing the mechanical system to move along the vertical axis compared to the frame.

For example, the mechanical system is connected to the spindle unit through a connecting plate, for example fixed to the motor and configured to transmit a translation movement to the spindle unit.

Advantageously, the extraction unit comprises an actuator, such as for example a pneumatic cylinder, having a body rigidly connected to the frame and a cylinder rod fixedly connected to an extraction plate surrounding at least partially the spindle shaft and configured to drive the extraction plate along the vertical axis.

For example, the vertical movement of the extraction plate is guided thanks to a vertical guiding pin fixed to the plate and located in a vertical through hole provided on the frame.

The extraction unit may further comprise a pushing device connected to the extraction plate and designed to come in axial contact with the annular product and notably a lateral radial face, during magnetic field measurement and extraction steps. The pushing device is radially mounted around a lower end of the spindle shaft. For example, the pushing device is a bearing, for example a plain bearing. As an alternative, the extraction plate and the pushing device are made in a single element.

Advantageously, the lifting unit comprises a lifting actuator, such as for example a pneumatic cylinder, having a body rigidly connected to the frame and a cylinder rod fixedly connected to a holder and configured to drive the holder along the vertical axis, the holder being delimited by an outer surface and an inner surface or bore designed to surround the lower part of the spindle shaft during the magnetic field measurement step, a lower radial face connected to the cylinder rod and an upper radial face, axially opposite to the lower face and designed to come in axial contact with the annular product during a positioning step of the product before and during the magnetic field measurement step.

For example, the inner diameter of the bore of the holder is bigger than the outer diameter of the spindle shaft and wherein the lower radial face of the holder extends towards the vertical axis so has to form a seat for the lower end of the spindle shaft in a positioning step of the annular product.

The sensor may be a hall effect sensor.

The outer surface of spindle shaft may be, for example, covered by a thin layer of chrome plating. Such layer helps to reduce friction between the shaft and the surrounding elements.

For example, the annular product is a rotor positioning bearing unit comprising a bearing comprising an inner ring and an outer ring centered on an axis, and an impulse ring provided with a target holder secured into a groove made in a cylindrical surface of the inner or outer ring, and with a magnetic target mounted the target holder.

According to another aspect, the invention relates to a method for determining a total pitch deviation of an annular product having at least a magnetic ring using a total pitch deviation measurement device according to any of the preceding claims.

The method comprises the following steps:

a) positioning the annular product on the pallet conveyor axially under the lower end of the spindle shaft, b) translating upwards the annular product on the shaft along the vertical axis by activating the lifting unit, notably the holder, until the annular product is fitted on the outer diameter of the spindle shaft and in axial contact with a vertical reference, such as for example the extraction unit.

When moving upwards the holder, the upper face of the holder comes in axial contact with the magnetic ring of the annular product, thereby lifting upwards the product. The lifting operation consists of two steps comprising, for example:

A first step in which, when moving upwards the holder, the lower tapered end of the spindle shaft comes into the bore of the bearing unit until the fitting load sets by the counterweight is reached.

In a second step, the holder continues to move upwards, and the spindle unit move upwards until the upper face of the annular product comes in axial contact with the extraction unit The method further comprises the following steps:

c) providing a fitting load to the spindle shaft in order to rotatably connect the shaft to the bearing unit and a vertical reference to the annular product on the extraction unit; and d) performing a magnetic field measurement of the magnetic ring of the annular product by rotating the spindle shaft along its rotational axis with the motor and e) transmitting the magnetic field signal to the encoder for determining the total pitch deviation.

In an embodiment, the method further comprises:

f) extracting the annular product from the spindle shaft by activating the extraction unit to push downwards the annular product, and by activating the lifting unit to translate downwards the annular product until the product bears on the pallet conveyor.

When fitting load is reached to the spindle shaft, and thus the spindle unit moves upwards and the counterweight of the mechanical system moves downwards and thereby drives the belt along the pulley. By virtue of the belt, the spindle unit and thus the spindle shaft is moved along the vertical axis and is guided by the axis guide.

For example, the extraction step comprises a first extraction step in which the actuator of the extraction unit is activated so as to translate the extraction plate and thus the pushing device along the vertical axis. The annular product is moved downwards by the pushing device, thereby axially pushing the holder of the lifting device. The spindle unit is then moved downwards, until coming in axial contact with a radial stopper provided on the frame, by action of the gravity.

The extraction step may further comprise a second extraction step in which downwards of the extraction plate and thus the pushing device of the extraction unit along the vertical axis is continued by action of the upper actuator. During this second extraction step, the lower actuator of the lifting unit is activated in order to translate downwards the cylinder rod and thus the holder. At the end of the second extraction step, the lifting device is in the preliminary position and the annular product bears axially on the pallet conveyor.

BRIEF DESCRIPTION OF THE DRAWINGS

The present invention and its advantages will be better understood by studying the detailed description of a specific embodiment given by way of a non-limiting example and illustrated by the appended drawings on which.

DETAILED DESCRIPTION OF THE INVENTION

In the following description, the terms "longitudinal, "transversal", "vertical", "front", "rear", "left" and "right" are defined according to a usual orthogonal benchmark as shown on the drawings, which includes:

a longitudinal axis X, horizontal and left to the right of front views;

a transversal axis Y, perpendicular to the longitudinal axis X and extending from the rear to the front of front views; and a vertical axis Z, orthogonal to the longitudinal and transversal axis X and Y.

Figure 1:
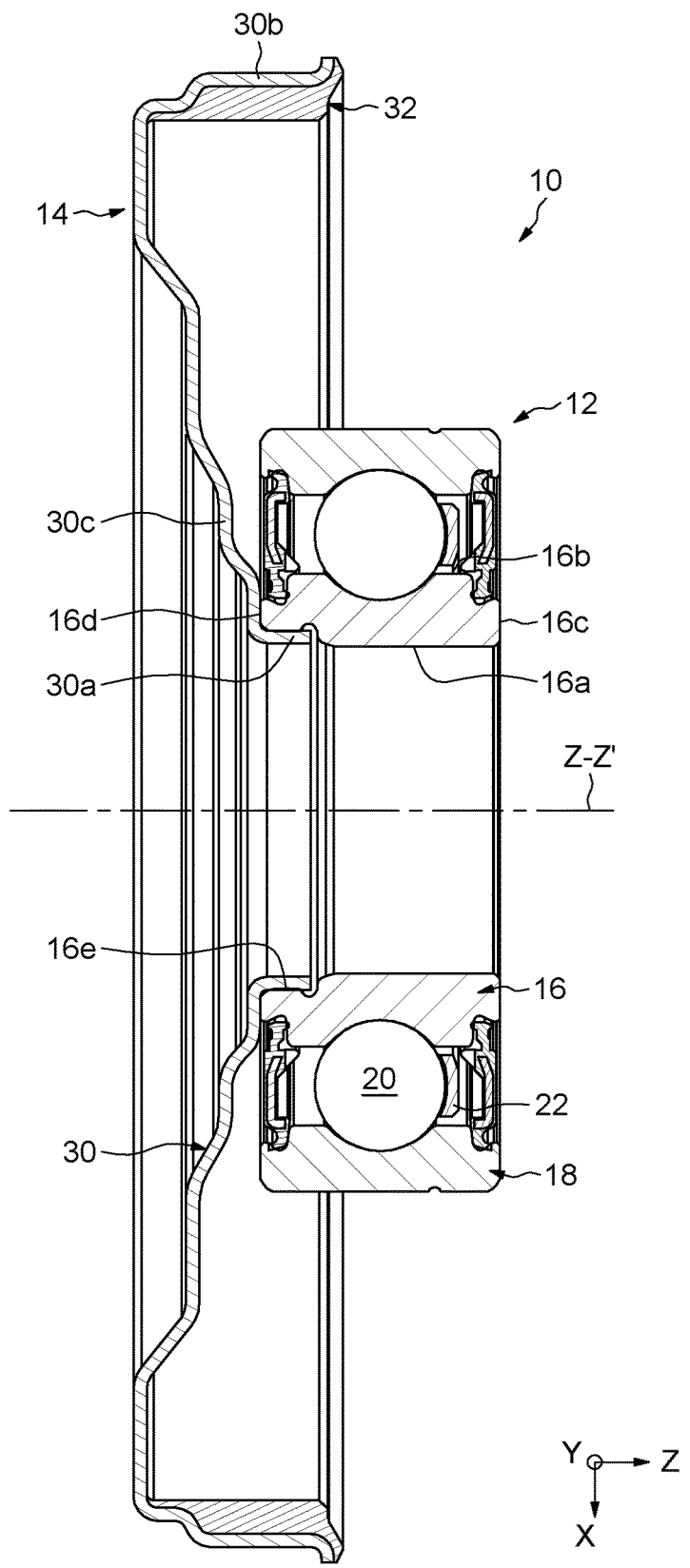
FIG. 1 is an axial section view of an example of a rotor positioning bearing unit.

The rotor positioning bearing unit 10 represented on FIG. 1 is adapted to equip an apparatus such a motor, a brake system, a suspension system or any rotating machine, in particular for an automotive vehicle.

The rotor positioning bearing unit 10 comprises a bearing 12 and an impulse ring 14 mounted on the bearing.

The bearing 12 comprises a first ring 16 and a second ring 18. In the illustrated example, the first ring 16 is the inner ring whereas the second ring 18 is the outer ring. The inner and outer rings 16, 18 are concentric and extend axially along the bearing rotation axis Z-Z' which runs in an axial direction. The inner and outer rings 16, 18 are made of steel.

In the illustrated example, the bearing 12 also comprises a row of rolling elements 20, which are provided here in the form of balls, interposed between raceways (not referenced) formed on the inner and outer rings 16, 18. The rolling bearing 10 also comprises a cage 22 for maintaining the regular circumferential spacing of the rolling elements 20.

The inner ring 16 of the bearing is intended to be mounted on a shaft (not shown) of the apparatus for tracking the rotation of the shaft. The inner ring 16 is intended to rotate while the outer ring 18 is intended to be fixed. The outer ring 18 can be mounted in a fixed support member or housing (not shown), belonging to the apparatus.

The inner ring 16 comprises a cylindrical inner surface or bore 16a and an outer cylindrical surface 16b which is radially opposite to the bore 16a and from which a toroidal circular raceway for the rolling elements 20 is formed, the raceway being directed radially outwards. The inner ring 16 further comprises two opposite radial lateral faces 16c, 16d which axially delimit the bore 16a and the outer surface 16b of the ring.

The inner ring 16 also comprises a cylindrical groove 16e made in the bore 16a. The groove 16e is centered on the axis Z-Z'. Diameter of bore 16a is smaller than diameter of groove 16e. The groove 16e opens on the radial lateral face 16d.

The impulse ring 14 is mounted on the inner ring 16. The impulse ring 14 comprises an annular target holder 30 mounted on the inner ring 16, and a magnetic target 32 mounted on the target holder 30.

The target holder 30 is secured into the annular groove 16e of the inner ring. The target holder 30 comprises an inner annular axial portion 30a mounted into the groove 16e, an outer annular axial portion 30b radially surrounding the inner axial portion 30a and the bearing 12, and an annular radial portion 30c extending between the inner and outer axial portions. As illustrated, the annular radial portion 30c comprises a plurality of connected radial and/or oblique portions. The axial dimension of the outer annular axial portion 30b is bigger than the axial dimension of the inner annular axial portion 30a.

The inner axial portion 30a of the target holder is fitted into the groove 16e of the inner ring to fasten in rotation the impulse ring 14 with the rotatable inner ring 16. In the disclosed example, the radial portion 30c of the target holder axially comes into contact against the radial lateral face 16d of the inner ring. The outer axial portion 30b of the target holder is located radially above the outer ring 18 of the bearing.

In the disclosed example, the target holder 30 is made in one part. The target holder 30 may be made of metal or plastic, formed by stamping or by any other suitable process.

The magnetic target 32 is mounted on the outer axial portion 30b of the target holder. In the disclosed example, the magnetic target 32 is mounted into the bore of the outer axial portion 30b. Alternatively, the magnetic target 32 may be mounted on the outer surface of the outer axial portion 30b.

The magnetic target 32 is a plastic molded part including magnetic alternating North and South alternated poles. Detection means (not shown) are associated with the target 32 for tracking the rotation of the impulse ring 14 and the inner ring 16 around the axis Z-Z'. The detection means are disposed to radially face the inner surface of the magnetic target 32. For example, the detection means may include Hall-effect sensors.

Figure 2:
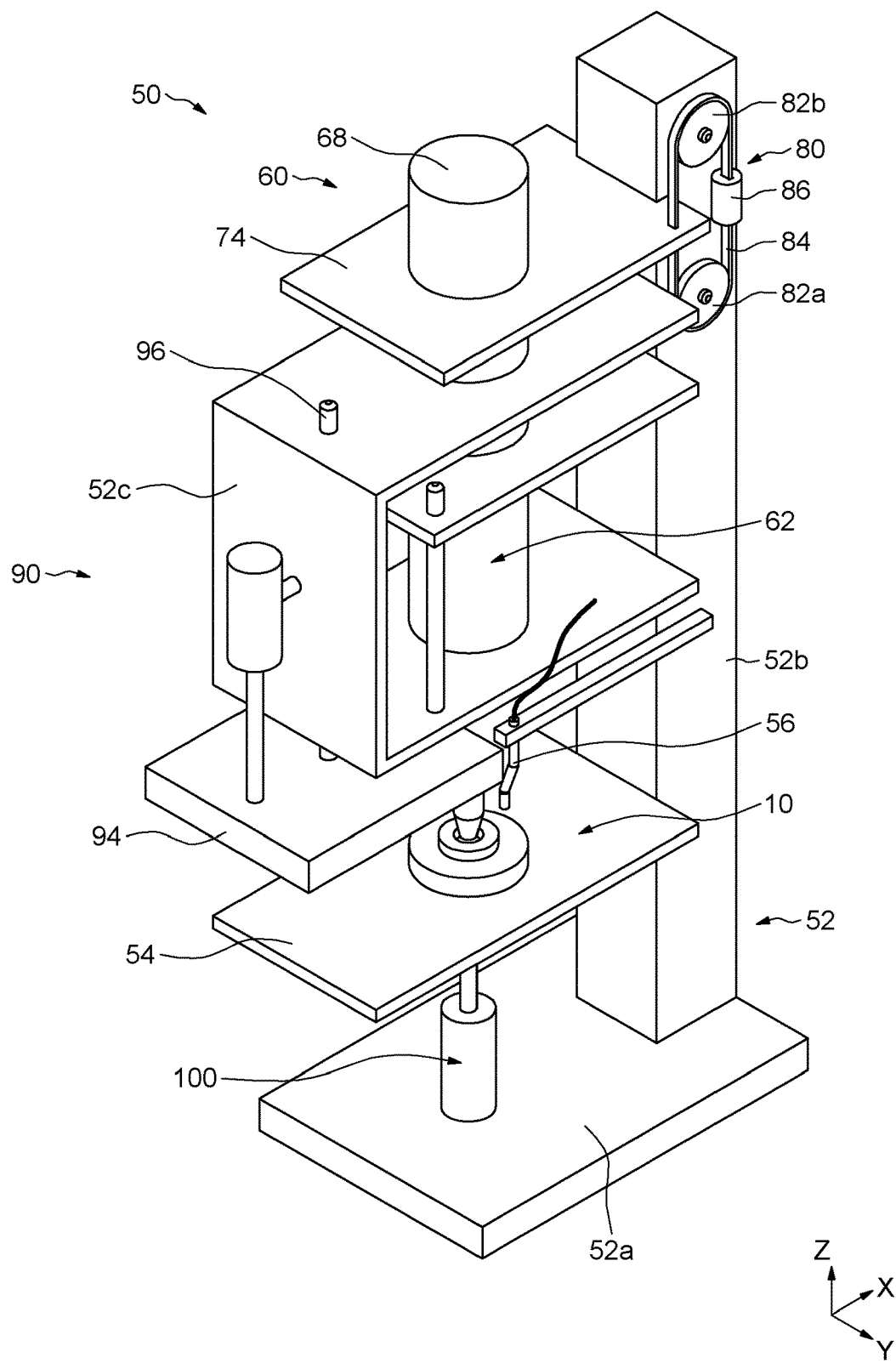
FIG. 2 is a perspective view of a total pitch deviation measurement device according to an embodiment of the invention.
Figure 3:
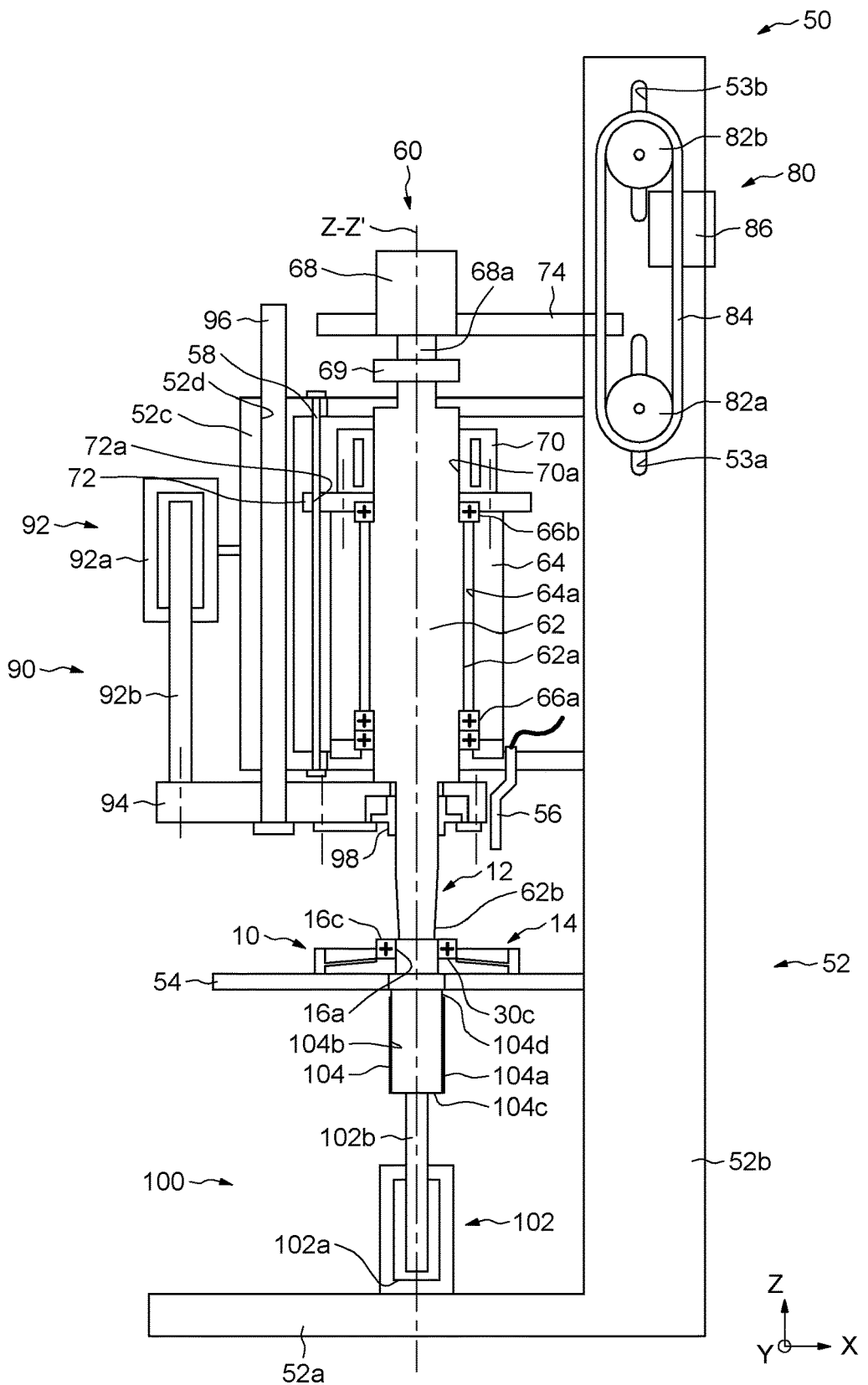
FIG. 3 is a partial half section view of the TPD measurement device of FIG. 2.

FIGS. 2 and 3 show a total pitch deviation measurement device 50 according to an embodiment of the invention configured to measure total pitch deviation of a rotor positioning bearing unit 10. The rotor positioning bearing unit 10 is not limited to the example as described in reference to FIG. 1. The total pitch deviation measurement device 50 could also be used to measure total pitch deviation of any annular product having a magnetic ring.

The total pitch deviation measurement (TPD) device 50 extends along a vertical axis Z and comprises a fixed frame 52 comprising a horizontal lower part 52a designed to be fixed for example on a table or on the floor, a vertical part 52a extending from the horizontal lower part 52a and an upper part 52c connected to the vertical part 52b.

The TPD device 50 comprises a pallet conveyor 54 fixed to the frame 52 and designed to support the rotor positioning bearing unit 10.

The TPD device 50 further comprises a spindle unit 60 mounted in translation compared to the frame 50, notably the upper part 52c. The spindle unit 60 comprises a spindle shaft 62 rotatably mounted in a spindle shaft sleeve 64 and supported by a plurality of bearings 66a, 66b located between the outer surface 62a of the spindle shaft 62 and the inner surface 64a or bore of the sleeve 64.

The spindle shaft 62 comprises a free lower end 62b having a tapered shape. The tapered shape 62b allows the rotor positioning bearing unit 10 to be centered along the shaft 62 and allows a good positioning of the bearing unit 10 compared to a referenced surface. The outer diameter of the spindle shaft 62 is substantially equal to the inner diameter of the bearing 12 of the rotor positioning bearing unit 10, so that the shaft 62 is rotatably connected to the rotor positioning bearing unit 10.

The outer surface 62a of spindle shaft 62 is, for example, covered by a thin layer (not shown) of chrome plating. Such layer helps to reduce friction between the shaft 62 and the surrounding elements.

The spindle unit 60 further comprises a motor 68, such as for example a brushless motor, through a coupling 69 connecting the motor shaft 68a to the spindle shaft 62.

The spindle unit 60 comprises an encoder 70 having its bore 70a in radial contact with the outer surface 62a of the spindle shaft 62. The encoder 70 is paired to the spindle shaft 62 thanks to low manufacturing tolerance. Such structure allows to avoid slippage between the spindle shaft 62 and the encoder 70.

The encoder 70 allows to perform a 3600 spatial acquisition of a magnetic field. The magnetic field is measured by a sensor 56 fixed to the frame 50, notably the vertical part 52b. The sensor 56 is, for example, a hall effect sensor. A free lower end of the sensor 56 is located at the vicinity of the rotor positioning bearing unit 10 during TPD measurement. The sensor 56 is configured to measure magnetic field signal at a position of the magnetic ring 14 of the bearing unit 10 and to transmit the signal measured to an electronic control unit (not shown) for determining the total pitch deviation.

The spindle unit 60, formed by the spindle shaft 62, the spindle sleeve 64, the motor 68 and the encoder 70, is slidably mounted along an axis guide 58 fixed to the frame 50, notably the upper part 52c. Therefore, the spindle unit 60 comprises a guiding plate 72 having a through hole 72a receiving the axis guide 58.

The load for the tight fitting of the spindle shaft 62 of the spindle unit 60 in the bore 16a of the rotor positioning bearing unit 10 is set by a mechanical system 80 connected to the spindle unit 60 through a connecting plate 74, for example fixed to the motor 68 and configured to transmit a translation movement to the spindle unit 60.

As illustrated, the mechanical system 80 comprises two pulleys 82a, 82b rotatably mounted on the frame 50 and a belt 84 surrounding the pulleys 82a, 82b. The axis of each pulley 82a, 82b is located in a corresponding slotted hole 53a, 53b allowing the mechanical system 80 to move along the vertical axis Z compared to the frame 50.

The belt 84 is secured to the connecting plate 74 of the spindle unit 60 and to a counterweight 86 designed for providing a requested load on the spindle shaft to be rotatably connected to the rotor bearing unit 10.

The TPD device 50 further comprises an extraction unit 90 configured to extract the rotor positioning bearing unit 10 from the spindle shaft 62 after magnetic field measurement is completed. The extraction steps will be further described in reference to FIGS. 8 and 9.

The extraction unit 90 comprises an actuator 92, such as for example a pneumatic cylinder, having a body 92a rigidly connected to the frame 50, notably the upper part 52c, and a cylinder rod 92b fixedly connected to an extraction plate 94 surrounding a part of the spindle shaft 62.

The cylinder rod 92b is configured to drive the extraction plate 94 along the vertical axis Z. The vertical movement of the extraction plate 94 is guided thanks to a vertical guiding pin 96 fixed to the plate 94 and located in a vertical through hole 52d provided on the upper part 52c of the frame 52.

The exaction unit 90 further comprises a pushing device 98 connected to the extraction plate 94 and designed to come in axial contact with the rotor positioning bearing unit 10, and notably a lateral radial face 16c of the bearing 12 of the unit 10, during magnetic field measurement and extraction steps, as will be described below. The pushing device 98 is radially mounted around a lower end of the spindle shaft 62. For example, the pushing device 98 is a bearing, for example a plain bearing.

The TPD measurement device 50 further comprises a lifting unit 100 configured to move the sensing bearing unit 10 upwards along the vertical axis Z before magnetic field measurement step and to maintain the rotor positioning bearing unit 10 during magnetic field measurement step.

The lifting unit 100 comprises a lifting actuator 102, such as for example a pneumatic cylinder, having a body 102a rigidly connected to the frame 50, notably the lower part 52a, and a cylinder rod 102b fixedly connected to a holder 104.

The holder 104 is delimited by an outer surface 104a and an inner surface or bore 104b designed to surround the lower part of the spindle shaft 62 during the magnetic field measurement step. The holder 104 is further delimited by a lower radial face 104c connected to the cylinder rod 102b and an upper radial face 104d, axially opposite to the lower face 104c. The upper radial face 104d is designed to come in axial contact with the annular target holder 30 of the impulse ring 14 of the rotor positioning bearing unit 10 during the positioning of the rotor positioning bearing unit 10 before and during the magnetic field measurement step.

The inner diameter of the bore 104b of the holder 104 is bigger than the outer diameter of the spindle shaft 62. The lower radial face 104c extends towards the vertical axis Z so has to form a seat for the lower end 62b of the spindle shaft 62 in a positioning step of the rotor positioning bearing unit 10.

FIGS. 4 to 9 shows the successive steps of a method 110 for determining a total pitch deviation of an annular product 10 having a magnetic ring using the TPD measurement device 50 of FIGS. 2 and 3.

Figure 4:
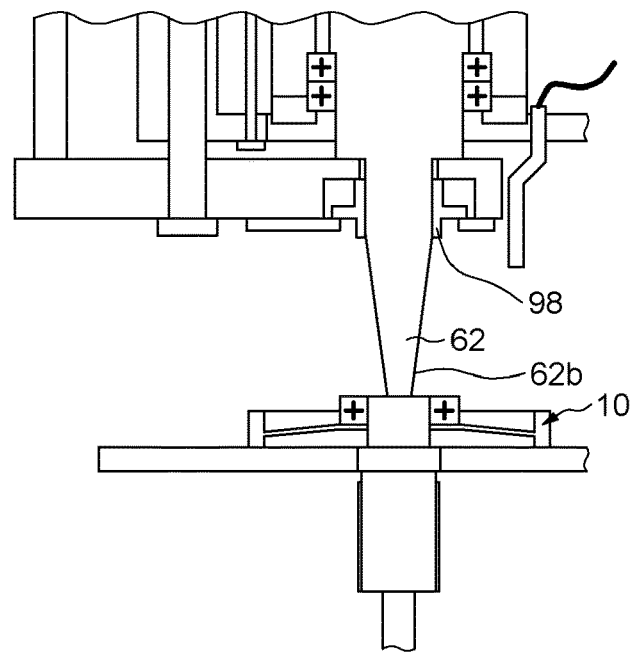
FIG. 4 to 9 illustrates successive steps of determining a total pitch deviation of an annular product using the TPD measurement device of FIGS. 2 and 3.
Figure 5:
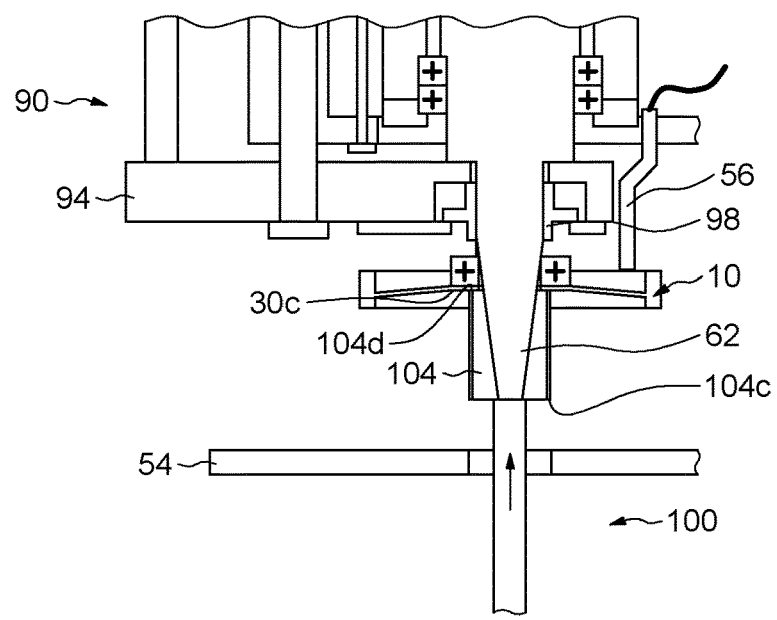

The method 110 for determining a total pitch deviation of the annular product 10 comprises a preliminary positioning step 112 of positioning the rotor positioning bearing unit 10 on the pallet conveyor 54 axially under the lower end 62b of the spindle shaft 62, as shown on FIG. 4.

Following the preliminary positioning step 112, a product lifting step 114 is applied in which the rotor positioning bearing unit 10 is translated upwards along the vertical axis Z by moving upwards the holder 104 of the lifting unit 100 using the lower actuator 102. When moving upwards the holder 104, the upper face 104d of the holder 104 comes in axial contact with the impulse ring 14 of the rotor positioning bearing unit 10, thereby lifting upwards the bearing unit 10.

The tapered shape of the lower end 62*b* of the spindle shaft 62 allows the rotor positioning bearing unit 10 to be centered compared to the rotational axial Z-Z' of the spindle shaft 62 when moving upwards the rotor positioning bearing unit 10.

The lifting step 114 is applied until the rotor positioning bearing unit 10 fits the spindle shaft 62. The lifting step 114 is shown on FIG. 5.

The upwards axial movement of the holder 104 is continued, at the positioning step 116, thereby moving upwards the spindle unit 60. until the upper face of the bearing unit 10 comes in axial contact with the extraction unit 98 and until a fitting load set by the counterweight is reached. At the end of the positioning step 116, the sensor 56 is located at a vicinity of the impulse ring 14 of the rotor positioning bearing unit 10.

Figure 6:
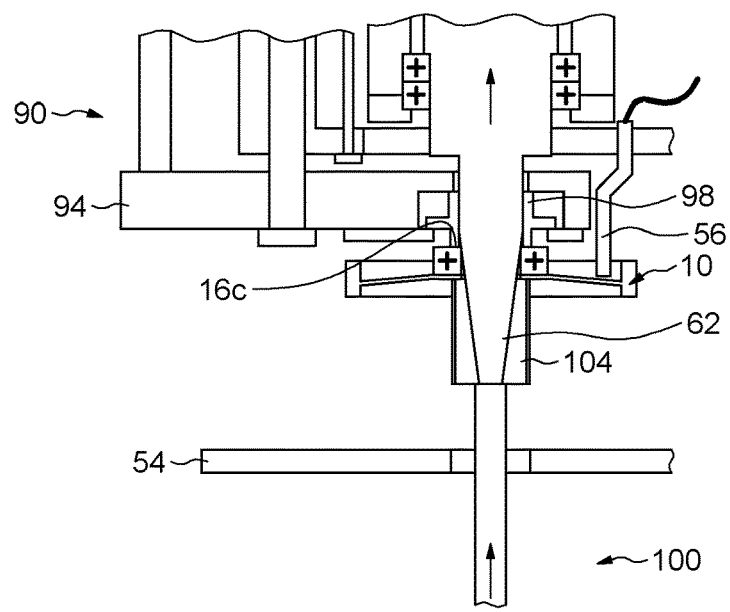

When the fitting load is reached the spindle shaft 62, and thus the spindle unit 60 moves upwards and the counterweight 86 of the mechanical system 80 moves downwards and thereby drives the belt 84 along the pulley 82*a*, 82*b*. By virtue of the belt 84, the spindle unit 60 and thus the spindle shaft 62 is moved upwards along the vertical axis and is guided by the axis guide 58. The counterweight 86 is designed for setting a fitting load of the spindle shaft 62 in the bore of the bearing unit 10. The positioning step 116 is shown in FIG. 6.

The lifting and positioning step may form a lifting operation comprising two steps.

Figure 7:
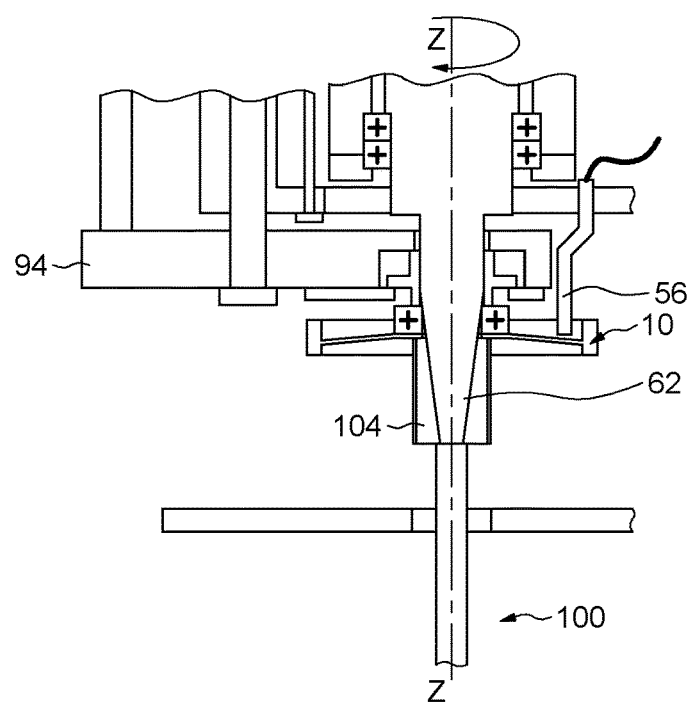

After the positioning step 116, a magnetic field measurement is performed, at step 118, by rotating the spindle shaft 62 along its rotational axis Z-Z' compared to the sleeve 64 with the motor 68 and the coupling 69. The rotation of the spindle shaft 62 drives the rotation of the rotor positioning bearing unit 10. The magnetic field measurement step is shown in FIG. 7. The signal of the magnetic field is then transmitted to an electronic control unit for determining the total pitch deviation.

Figure 8:
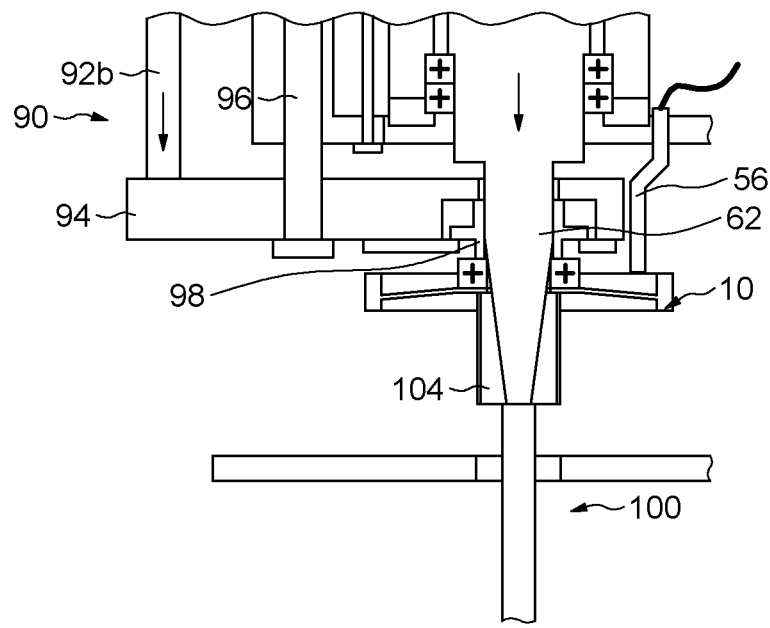

After the magnetic field measurement step 118, a first extraction step 120 is applied, in which the extraction unit 90 is used to push downwards the rotor positioning bearing unit 10. The actuator 92 of the extraction unit 90 is activated so as to translate the extraction plate 94 and thus the pushing device 98 along the vertical axis Z. The rotor positioning bearing unit 10 is moved downwards by the pushing device 98, thereby axially pushing the holder 104 of the lifting device 100. The spindle unit 60, and thus the spindle shaft 62, is then moved downwards, until the spindle unit 60 comes in axial contact with a radial stopper (not shown) provided on the upper part 52*c* of the frame 50, by action of the gravity along the vertical axis Z. The first extraction step is shown in FIG. 8.

Figure 9:
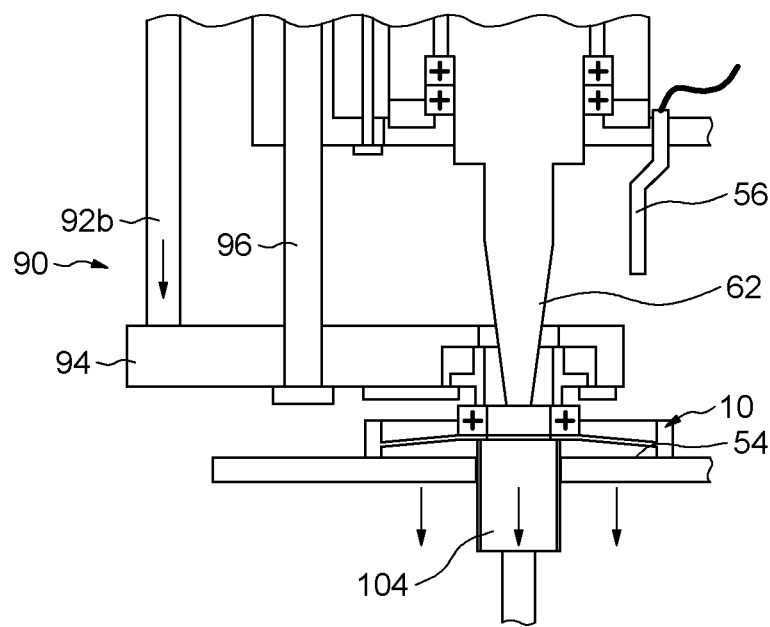
Figure 10:
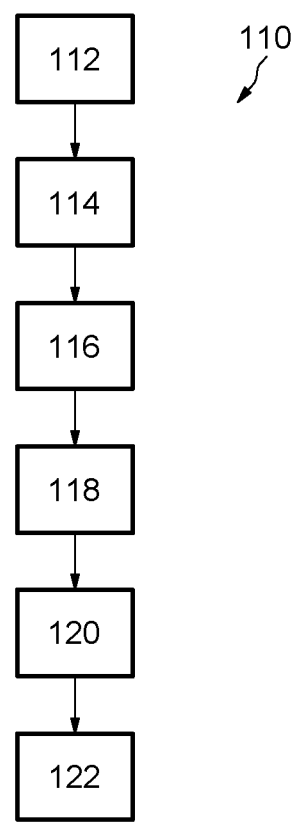
FIG. 10 shows the main steps of a method for determining a total pitch deviation of an annular product implemented by the measurement device the rotor positioning bearing unit of FIG. 1 according to a second example of the invention.

A second extraction step 122, shown in FIG. 9, is then applied by continuing to move downwards the extraction plate 94 and thus the pushing device 98 of the extraction unit 10 along the vertical axis Z by action of the upper actuator 90. During this step 122, the lower actuator 102 of the lifting unit 100 is activated in order to translate downwards the cylinder rod 102*b* and thus the holder 104. At the end of the second extraction step 122, the lifting device 100 is in the preliminary position and the rotor positioning bearing unit 10 bears axially on the pallet conveyor 54.

Such a TPD measurement device is fully automatic and does not need human intervention which significantly reduces positioning errors. Furthermore, the TPD measurement device according to the invention allows to have reduced runout of the product during TPD measurement.

The invention claimed is:

1. A total pitch deviation measurement device configured to determine a total pitch deviation of an annular product having at least a magnetic ring, the device comprising:
   a frame;
   a pallet conveyor fixed to the frame and designed to support the annular product;
   a spindle unit mounted in translation compared to the frame along a vertical axis, the spindle unit comprising at least a spindle shaft, a motor rotatably driving the spindle shaft, and an encoder rigidly connected to the spindle shaft; the spindle shaft comprising a free lower end having a tapered shape configured to be fitted in a bore of the annular product; a sensor fixed to the frame and configured to measure a magnetic field signal at a position of the magnetic ring and to transmit the signal measured to an electronic control unit for determining the total pitch deviation of the annular product;
   a lifting unit configured to move the annular product upwards along the vertical axis on the spindle shaft before a magnetic field measurement; and
   a mechanical system configured to provide a required fitting load to guarantee the position of the annular product on the spindle shaft before the magnetic field measurement.

2. The total pitch deviation measurement device according to claim 1, comprising an extraction unit configured to extract the annular product from the spindle shaft after magnetic field measurement.

3. The total pitch deviation measurement device according to claim 1, wherein at least one part of the outer diameter of the spindle shaft is substantially equal to the inner diameter of the annular product so that the shaft is rotatably connected to the product.

4. The total pitch deviation measurement device according to claim 1, wherein the mechanical system is configured to provide a fitting load, and comprises two pulleys rotatably mounted on the frame, a belt surrounding the pulleys and secured to the spindle unit and to a counterweight designed for setting a fitting load of the spindle unit in the bore of the annular product.

5. The total pitch deviation measurement device according to claim 1, wherein the exaction unit comprises an actuator having a body rigidly connected to the frame and a cylinder rod fixedly connected to an extraction plate surrounding at least partially the spindle shaft and configured to drive the extraction plate along the vertical axis.

6. The total pitch deviation measurement device according to claim 1, wherein the lifting unit comprises a lifting actuator having a body rigidly connected to the frame and a cylinder rod fixedly connected to a holder and configured to drive the holder along the vertical axis, the holder being delimited by an outer surface and an inner surface or bore designed to surround the lower part of the spindle shaft during magnetic field measurement, a lower radial face connected to the cylinder rod and an upper radial face, axially opposite to the lower face and designed to come in axial contact with the annular product during positioning of the product before and during magnetic field measurement.

7. The total pitch deviation measurement device according to claim 1, wherein the sensor is a hall effect sensor.

8. The total pitch deviation measurement device according to claim 1, wherein the outer surface of spindle shaft is covered by a layer of chrome plating.

9. A method for determining a total pitch deviation of an annular product having at least a magnetic ring using a total pitch deviation measurement device comprising:

providing a frame; a pallet conveyor fixed to the frame and designed to support the annular product; a spindle unit mounted in translation compared to the frame along a vertical axis, the spindle unit comprising at least a spindle shaft, a motor rotatably driving the spindle shaft, and an encoder rigidly connected to the spindle shaft; the spindle shaft comprising a free lower end having a tapered shape configured to be fitted in a bore of the annular product; a sensor fixed to the frame and configured to measure a magnetic field signal at a position of the magnetic ring and to transmit the signal measured to an electronic control unit for determining the total pitch deviation of the annular product; a lifting unit configured to move the annular product upwards along the vertical axis on the spindle shaft; and a mechanical system configured to provide a required fitting load to guarantee the position of the annular product on the spindle shaft, positioning the annular product on the pallet conveyor axially under the lower end of the spindle shaft;

translating upwards the annular product on the shaft along the vertical axis by activating the lifting unit until the annular product is fitted on the outer diameter of the spindle shaft and in axial contact with a vertical reference;

providing a fitting load to the spindle shaft in order to rotatably connect the shaft to the bearing unit;

performing a magnetic field measurement of the magnetic ring of the annular product by rotating the spindle shaft along its rotational axis with the motor; and transmitting the magnetic field signal to an electronic control unit for determining the total pitch deviation of the annular product.

10. The method according to claim 9, comprising:

extracting the annular product from the spindle shaft by activating the extraction unit to push downwards the annular product, and by activating the lifting unit to translate downwards the annular product until the product bears on the pallet conveyor.

\* \* \* \* \*